United States Patent Office 3,404,975
Patented Oct. 8, 1968

3,404,975
m-(CARBAMOYLOXY)-CARBANILATES AS HERBICIDES
Kenneth R. Wilson, Lockport, and Kenneth L. Hill, Middleport, N.Y., assignors to FMC Corporation, New York, N.Y., a corporation of Delaware
No Drawing. Continuation-in-part of application Ser. No. 419,559, Dec. 18, 1964. This application Nov. 15, 1965, Ser. No. 507,713
25 Claims. (Cl. 71—100)

ABSTRACT OF THE DISCLOSURE

Herbicidal compositions containing m-(carbamoyloxy)-carbanilates.

---

This application is a continuation-in-part of application Ser. No. 419,559, filed Dec. 18, 1964, now abandoned.

This invention relates to novel herbicidal compounds, to new herbicidal compositions and to a new method for the control of undesired plant growth, both pre-emergently and post-emergently, by application of said new and useful herbicidal compositions.

The novel compounds of this invention are m-(carbamoyloxy)carbanilates of the following structure:

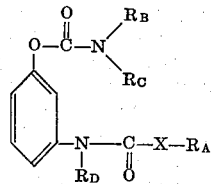

wherein $R_A$ is the radical of an alcohol or phenol of the formula $R_AOH$,

is the radical of a primary or secondary amine of the formula

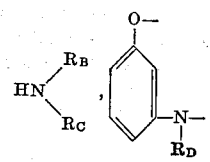

is the radical of a m-aminophenol of the formula

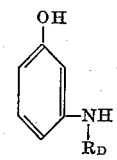

and X is oxygen or sulfur. The substituents $R_B$ and $R_C$ may also form together a heterocyclic ring with the nitrogen to which they are attached, e.g. a morpholine or piperidine compound.

In one useful class of compounds, $R_A$ is an aliphatic hydrocarbon radical, such as an alkyl, alkenyl, or alkynyl radical such as methyl, ethyl, propyl, isopropyl, butyl, isobutyl, tert-butyl, sec-butyl, pentyl, 1-ethylpropyl, allyl, 2-methylallyl, 2-butenyl, propynyl or 1-methyl-2-propynyl radical. Compounds having a cyclic $R_A$ group, e.g. cyclohexyl, cyclopropyl, phenyl, or a group containing atoms other than carbon and hydrogen, e.g. a methoxyethyl group, may also be used. Preferably, $R_A$ is an alkyl or alkenyl radical of relatively low molecular weight; thus, when X is oxygen, best results are obtained when $R_A$ has less than six carbon atoms, preferably less than five carbon atoms, while when X is sulfur there are preferably less than three carbon atoms, so that in one preferred class $R_AX$ has a molecular weight less than 74.

In the preferred types of the compounds of this invention, $R_B$ is hydrocarbon radical and $R_C$ is hydrogen or a hydrocarbon radical: Examples of such hydrocarbon radicals are alkyl radicals, such as methyl, ethyl, propyl, isopropyl, butyl, isobutyl, tert-butyl, sec-butyl, pentyl, neopentyl, 1-methylbutyl, isopentyl, hexyl, 1,1,3,3-tetra-

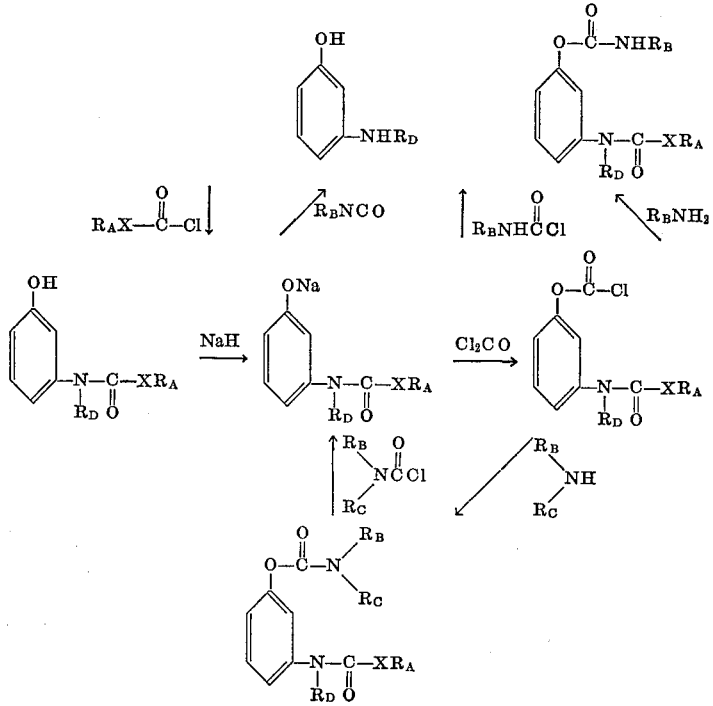

methylbutyl, alkenyl radicals such as allyl, 2-methylallyl, 2-butenyl, 1-ethylallyl, cycloaliphatic radicals such as cyclohexyl or cyclopropyl, and aromatic radicals such as phenyl or tolyl. Compounds in which there are additional elements (e.g. chlorine or oxygen, as in 2-chloroethyl or 2-methoxyethyl) besides carbon and hydrogen in the $R_B$ or $R_C$ radicals are also within the broad scope of this invention. In a class which is particularly preferred because of its high herbicidal effectiveness, the $R_B$ and $R_C$ substituents are relatively short, e.g. the sum of the lengths of the longest straight chain (or single carbon) of the $R_B$ substituent, and the longest straight chain (or single carbon) of the $R_C$ substituent is about 4 carbon atoms or less.

$R_D$ is preferably hydrogen or a methyl group.

The novel compounds of this invention may be prepared by methods employed for syntheses of carbamic and carbanilic acid esters. For example, a very useful series of reactions was outlined previously.

The intermediate m-hydroxycarbanilic acid esters may be prepared by treatment of m-aminophenol or a N-monosubstituted-m-aminophenol with the appropriate chloroformate, or chlorothioformate ester in the presence of a suitable acid acceptor.

The reaction of an isocyanate with an appropriate m-hydroxycarbanilic acid ester to give the corresponding monosubstituted-carbamate ester may be catalyzed by materials such as triethylamine, 1,4-diazabicyclo[2.2.2]-octane, dibutyltin diacetate, dimethyltin dichloride and dibutylbis(dodecylthio)tin.

Reaction of the sodium salt of a m-hydroxycarbanilic acid ester with a N-monosubstituted- or a N,N-disubstituted-carbamoyl halide will produce the corresponding m-[(N-monosubstituted- or N,N-disubstituted-carbamoyl) oxy] carbanilic acid ester. The same products may be obtained by first treating the sodium salt of a m-hydroxycarbanilic acid ester with phosgene to form the chloroformate ester, and reaction of this compound with a primary or secondary amine. The intermediate sodium salt of the m-hydroxycarbanilic acid ester is formed in an non-aqueous solvent, using a reagent such as sodium hydride, to avoid hydrolysis of the ester linkage.

Another series of reactions useful for the preparation of these compounds is as follows:

The intermediate m-nitrophenyl carbamates are obtained by reaction of m-nitrophenol with an appropriate isocyanate, or by reaction of the sodium salt of m-nitrophenol with an N-monosubstituted- or a N,N-disubstituted-carbamoyl halide. They may also be prepared by conversion of m-nitrophenol to its chloroformate ester with phosgene, and reaction of this ester with a primary or secondary amine. These m-nitrophenyl carbamates are readily reduced to the corresponding m-aminophenyl carbamates.

Treatment of the m-aminophenyl N-monosubstituted- or N,N-disubstituted-carbamate with an appropriate chloroformate, or chlorothioformate ester, in the presence of a suitable acid acceptor, will give the desired m-[(N-monosubstituted- or N,N-disubstituted-carbamoyl)oxy] carbanilate ester. Formation of the possible by-product, a urylenediphenylene biscarbamate, is minimized by slow addition of the m-aminophenyl carbamate to a solution of the chloroformate ester, so that the latter is always present in a large excess.

Other methods useful for the preparation of m-[(N-substituted-carbamoyl)oxy] carbanilic acid esters include the reaction of a m-hydroxycarbanilic acid ester with an alkyl N-substituted-carbamate of a N-substituted-urea. The reaction may be driven to completion by removal of the volatile alcohol or ammonia formed. Similarly, reaction of an alkyl carbonate ester of the m-hydroxycarbanilate with a primary or secondary amine will yield the desired carbamate and an alcohol. Removal of this alcohol wil force the reaction to completion.

These reactions of amines with chloroformate esters and of phenols with phosgene, isocyanates, carbamoyl halides and the other reagents described hereinabove are well known in the art. For example, useful procedures for the preparation of carbamic acid and carbanilic acid esters are described by R. B. Wagner and H. D. Zook, "Synthetic Organic Chemistry," Chap. 23, John Wiley and Sons, Inc., New York, 1953.

Obviously the reactants selected will depend on the final product desired, as will the choice of synthetic procedures used. The m-(carbamoyloxy) carbanilate esters thus produced are novel compounds, and the characterized by excellent herbicidal properties.

For herbicidal applications, the active m-(carbamoyl-

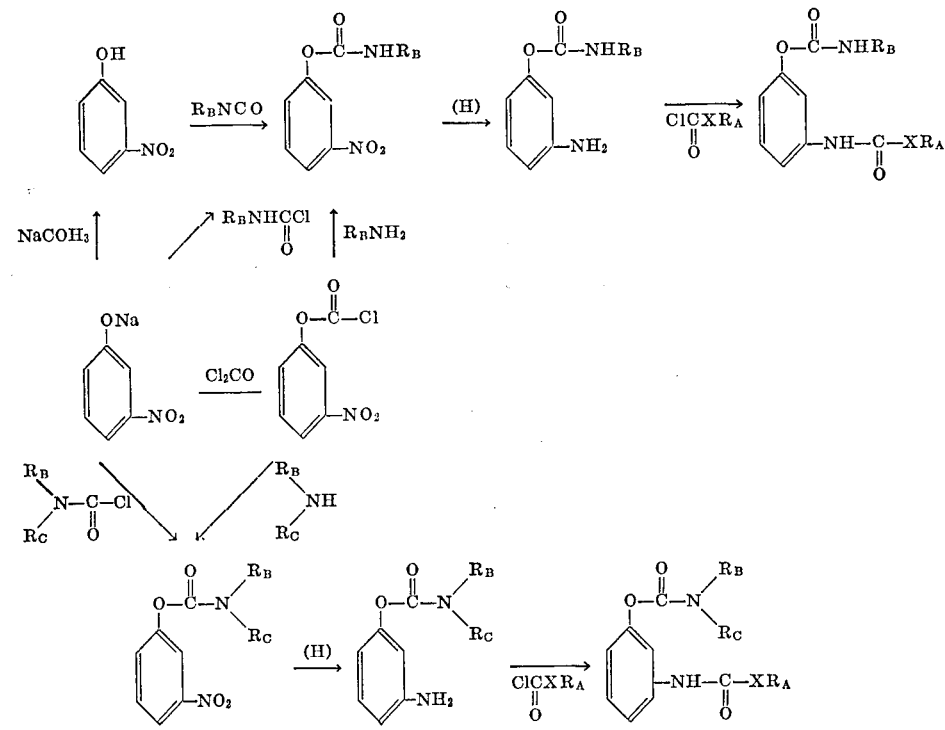

oxy)-carbanilate esters as above defined are formulated into herbicidal compositions, by admixture, in herbicidally effective amounts, with the adjuvants and carriers normally employed for facilitating the dispersion of active ingredients for agricultural applications, recognizing the fact that the formulation and mode of application of a toxicant may effect the activity of the material in a given application. Thus, these active herbicidal compounds may be formulated as granules of relatively large particle size, as wettable powders, as emulsifiable concentrates, as powdery dusts, as solutions, or as any of several other known types of formulations, depending on the desired mode of application. Preferred formulations for both pre- and post-emergence herbicidal applications are wettable powders, emulsifiable concentrates, and granules. These formulations may contain as little as 0.5% to as much as 95% or more by weight of active ingredient.

Wettable powders are in the form of finely divided particles which disperse readily in water or other dispersant. The wettable powder is ultimately applied to the soil either as a dry dust or as a dispersion in water or other liquid. Typical carriers for wettable powders include fuller's earth, kaolin clays, silicas and other readily wet organic or inorganic diluents. Wettable powders normally are prepared to contain about 5–95% of active ingredient by weight and usually also contain a small amount of wetting, dispersing or emulsifying agent to facilitate wetting and dispersion. For example, a useful wettable powder formulation contains 80.8 parts by weight of the m-(carbamoyloxy) carbanilate ester, 17.9 parts by weight of palmetto clay, and 1.0 part by weight of sodium lignosulfonate and 0.3 part by weight of sulfonated aliphatic polyester as wetting agents.

Emulsifiable concentrates are homogeneous liquid compositions which are dispersible in water or other dispersant, and may consist entirely of the m-(carbamoyloxy)-carbanilate ester with a liquid or solid emulsifying agent, or may also contain a liquid carrier, such as xylene, heavy aromatic naphthas, isophorone and other non-volatile organic solvents. For herbicidal application these concentrates are dispersed in water or other liquid carrier, and normally applied as a spray to the area to be treated. The percentage by weight of the essential active ingredient may vary according to the manner in which the composition is to be applied, but in general comprises 0.5 to 95% of active ingredient by weight of the herbicidal composition. For example, a useful emulsifiable concentrate formulation contains 11.6 parts by weight of the m-(carbamoyloxy)carbanilate ester, 57.7 parts by weight of cresol, and 30.7 parts by weight of sulfated ethoxylated nonylphenol.

Granular formulations, wherein the toxicant is carried on relatively coarse particles, are usually applied without dilution to the area in which suppression of vegetation is desired. Typical carriers for granular formulations include sand, fuller's earth, bentonite clays, vermiculite, perlite and other organic or inorganic materials which absorb or which may be coated with the toxicant. Granular formulations normally are prepared to contain about 5–25% of active ingredient and may also contain small amounts of other ingredients which may include surface-active agents such as wetting agents, dispersing agents or emulsifiers; oils such as heavy aromatic naphthas, kerosene or other petroleum fractions, or vegetable oils; and/or stickers such as dextrins, glue or synthetic resins. The average particle size of the granules is usually between 150 and 2400 microns. For example, a useful granular formulation contains 5.05 parts by weight of the m-(carbamoyloxy)carbanilate ester, 5.00 parts by weight of corn oil, and 89.95 parts by weight of crushed corn cobs.

Typical wetting, dispersing or emulsifying agents used in agricultural formulations include, for example, the alkyl and alkylaryl sulfonates and sulfates and their sodium salts; polyhydric alcohols; and other types of surface-active agents, many of which are available in commerce. The surface-active agent, when used, normally comprises from 0.1% to 15% by weight of the herbicidal composition.

Dusts, which are free-flowing admixtures of the active ingredient with finely divided solids such as talc, clays, flours, and other organic and inorganic solids which act as dispersants and carriers for the toxicant, are useful formulations for soil-incorporated applications; the finely divided solids have an average particle size of less than about 50 microns.

Pastes, which are homogeneous suspensions of a finely divided solid toxicant in a liquid carrier such as water or oil, are employed for specific purposes. These formulations normally contain about 5–95% of active ingredient by weight, and may also contain small amounts of a wetting, dispersing or emulsifying agent to facilitate dispersion. For application, the pastes are normally diluted and applied as a spray to the area to be affected.

Other useful formulations for herbicidal applications include simple solutions of the active ingredient in a dispersant in which it is completely soluble at the desired concentration, such as acetone, alkylated naphthalenes, xylene or other organic solvents. Pressurized sprays, typically aerosols wherein the active ingredient is dispersed in finely divided form as a result of vaporization of a low boiling dispersant solvent carrier, such as the Freons, may also be used.

The preparation, properties, and herbicidal activity of representaitve compounds of this invention are illustrated further in the following examples, in which all temperatures are in degrees centigrade.

Example 1.—Methyl m-[(methylcarbamoyl)oxy] carbanilate

The intermediate methyl m-hydroxycarbanilate was prepared as follows: To a solution of 43.6 g. of m-aminophenol in 250 ml. of dry acetonitrile was added 18.9 g. of methyl chloroformate at a rate which maintained the temperature of the solution below 40°. The resultant mixture was stirred for one hour at room temperature and for two hours at reflux temperature, then cooled. The precipitate of m-aminophenol hydrochloride was removed by filtration and the filtrate was evaporated to dryness. The crude product was recrystallized from water to yield 11.0 g. of methyl m-hydroxycarbanilate melting at 94–6°.

This product was reacted with methyl isocyanate as follows: To a stirred solution of 5.5 g. of methyl m-hydroxycarbanilate and two drops of triethylamine in 75 ml. of ether, 2.3 g. of methyl isocyanate was added dropwise. The mixtures was stirred and refluxed for 18 hours and cooled. The white crystalline product was isolated by filtration. A yield of 4.5 g. of methyl m-[(methylcarbamoyl)oxy]carbanilate, melting at 130–2°, was obtained. On recrystallization from toluene, this ester melted at 131°.

*Analysis.*—Calculated for $C_{10}H_{12}N_2O_4$: C, 53.56; H, 5.39; N, 12.49. Found: C, 53.80; H, 5.57; N, 12.45.

The pre-emergence herbicidal activity of methyl m-[(methylcarbamyl)oxy]carbanilate was demonstrated as follows: In flat pans was placed, to a depth of three inches, a 1:1 mixture of silt loam and sandy loam soil. In the soil were then planted seeds of crabgrass (*Digitari sanguinalis*), German hay millet (*Setaria italica*), yellow foxtail (*Setaria glauca*), flax (*Linum usitatissimum*) mustard (*Brasica juncea*), and lettuce (*Lactuca sativa*), at a depth of one-forth to one-half inch. As soon as the seeds were planted and the flats watered, the toxicant was sprayed on the soil as an acetone-water solution, at a rate equivalent to six pounds of toxicant per acre. Both the treated flats and an untreated control were held in the greenhouse for approximately three weeks, after which time the performance of the toxicant was assessed in terms of percent kill with respect to the untreated control. Results are presented in Table 1:

TABLE 1.—PRE-EMERGENCE HERBICIDAL ACTIVITY

| Test plant species: | Percent kill |
|---|---|
| Crabgrass | 100 |
| German hay millet | 100 |
| Yellow foxtail | 100 |
| Flax | 100 |
| Mustard | 100 |
| Lettuce | 100 |

The post-emergence herbicidal activity of methyl-m-[(methylcarbamoyl)oxy]carbanilate was demonstrated as follows: In flat pans was placed, to a depth of three inches, a 1:1 mixture of slit loam and sandy loam soil. In the soil were then planted seeds of corn (*Zea mays*), pea (*Pisum sativum*), peanut (*Arachis hypogaea*), cotton (*Gossypium hirsutum*), and soybean (*Glycine max*), at a depth of approximately one inch, and seeds of oats (*Avena sativa*), flax (*Linum usitatissimum*), mustard (*Brassica juncea*), lettuce (*Lactuca sativa*), tomato (*Lycopersicum esculentum Mill.*), pigweed (*Amaranthus retroflexus*), crabgrass (*Digitaria sanguinalis*), barnyard grass (*Echinochloa crusgalli*), carrot (*Daucus carota*), cucumber (*Cucumis sativus*), safflower (*Carthamus tinctoruis*), at a depth of one-fourth to one-half inch. The flats were watered, and the seeds allowed to grow in the greenhouse for two weeks. Maintaining an untreated control, the stand of plants was then sprayed with a solution of methyl m-[(methylcarbamoyl)oxy]carbanilate in aqueous acetone, at the rate equivalent to six pounds of toxicant per acre. Both treated and untreated plants were held in the greenhouse for two to three weeks, after which the number of surviving plants were counted, and the percent kill with respect to the untreated control was determined.

Results are presented in Table 2 below.

TABLE 2.—POST-EMERGENCE HERBICIDAL ACTIVITY

| Test plant species: | Percent kill |
|---|---|
| Corn | 0 |
| Oats | 0 |
| Peanut | 0 |
| Cotton | 80 |
| Soybean | 100 |
| Flax | 75 |
| Mustard | 100 |
| Lettuce | 100 |
| Pea | 0 |
| Tomato | 100 |
| Pigweed | 100 |
| Crabgrass | 20 |
| Barnyard grass | 0 |
| Carrots | 100 |
| Cucumber | 100 |
| Safflower | 100 |

These results illustrate the effective action of the subject herbicide, in both pre-emergence and post-emergence application, against a broad spectrum of plant species.

In the following specific examples, which are given to further illustrate this invention, the pre-emergence and post-emergence herbicidal data reported for various plant species were obtained by the test methods described in Example 1.

Example 2.—Methyl m-[(ethylcarbamoyl)oxy]carbanilate

A mixture of 25.0 g. of methyl m-hydroxycarbanilate, 11.2 g. of ethyl isocyanate, and five drops of triethylamine was heated in a stoppered flask at 60° for three hours, cooled, and the crude product was recrystallized from ethyl acetate to yield 24.3 g. of solid melting at 146–50°.

Recrystallization from toluene gave methyl m[(ethylcarbamoyl)oxy]carbanilate melting at 156–7°.

*Analysis.*—Calculated for $C_{11}H_{14}N_2O_4$: C, 55.45; H, 5.92; N, 11.76. Found: C, 55.57; H, 5.98; N, 11.52.

On pre-emergence testing of this compound 100% of mustard, lettuce, German hay millet, flax, crabgrass, and chickweed were killed by a six pound per acre dosage.

In a post-emergence test, a dosage of six pounds per acre killed 100% of mustard, lettuce, and chickweed, 95% of flax and crabgrass, and 75% of German hay millet.

Example 3.—Methyl m-[(propylcarbamoyl)oxy]carbanilate

Following the procedure described in Example 2, methyl m-hydroxycarbanilate was reacted with propyl isocyanate, in the presence of 1,4-diazabicyclo[2.2.2]octane, to yield methyl m-[(propylcarbamoyl)oxy]carbanilate melting at 148.5–9.5° after recrystallization from toluene.

*Analysis.*—Calculated for $C_{12}H_{16}N_2O_4$: C, 57.13; H, 6.39; N, 11.11. Found: C, 56.93; H, 6.31; N, 10.84.

A pre-emergence application of six pounds per acre of this compound killed 100% of mustard, lettuce, German hay millet, flax, crabgrass, and chickweed.

In a post-emergence test, 100% of mustard, lettuce, flax, crabgrass, and chickweed, and 90% of German hay millet were killed by a six pound per acre dosage.

Example 4.—Methyl m-[(isopropylcarbamoyl)oxy]carbanilate

Following the procedure described in Example 2, methyl m-hydroxycarbanilate was reacted with isopropyl isocyanate, in the presence of 1,4-diazabicyclo[2.2.2]octane, to yield methyl m-[(isopropylcarbamoyl)oxy]carbanilate melting at 167–8° after recrystallization from toluene.

*Analysis.*—Calculated for $C_{12}H_{16}N_2O_4$: C, 57.13; H, 6.39; N, 11.11. Found: C, 57.10; H, 6.46; N, 11.21.

In a pre-emergence test, a six pound per acre application resulted in 100% kill of mustard, lettuce, German hay millet, flax, crabgrass, and chickweed.

A dosage of six pounds per acre of this compound, applied post-emergently, killed 100% of mustard, lettuce, German hay millet, flax, and chickweed, and 95% of crabgrass.

Example 5.—Methyl m-[(butylcarbamoyl)oxy]carbanilate

Following the procedure described in Example 2, methyl m-hydroxycarbanilate was reacted with butyl isocyanate, in the presence of 1,4-diazabicyclo[2.2.2]octane, to yield methyl m-[(butylcarbamoyl)oxy]carbanilate melting at 117–8° after recrystallization from a benzene-hexane mixture.

*Analysis.*—Calculated for $C_{13}H_{18}N_2O_4$: C, 58.63; H, 6.81; N, 10.52. Found: C, 58.85; H, 7.03; N, 10.81.

On pre-emergence testing of this compound, a six pound per acre dosage killed 100% of mustard, lettuce, German hay millet, flax, barnyard grass, and chickweed.

In a post-emergency test, 100% of mustard, lettuce, German hay millet, crabgrass, and chickweed, and 95% of flax were killed by a six pound per acre application.

Example 6.—Methyl m-[(tert-butylcarbamoyl)oxy]carbanilate

Following the procedure described in Example 2, methyl m-hydroxycarbanilate was reacted with tert-butyl isocyanate, in the presence of 1,4-diazabicyclo[2.2.2]octane, to yield methyl m-[(tert-butylcarbamoyl)oxy]carbanilate melting at 162–3° after recrystallization from ethyl acetate.

*Analysis.*—Calculated for $C_{13}H_{18}N_2O_4$: C, 58.63; H, 6.81; N, 10.52. Found: C, 58.49; H, 6.66; N, 10.78.

In both pre-emergence and post-emergence applications, a dosage of six pounds per acre of this compound killed 100% of mustard, lettuce, German hay millet, flax, crabgrass, and chickweed.

Example 7.—Methyl m-[(isobutylcarbamoyl)oxy] carbanilate

Following the procedure described in Example 2, methyl m-hydroxycarbanilate was reacted with isobutyl isocyanate, in the presence of 1,4-diazabicyclo[2.2.2]octane, to yield methyl m-[(isobutylcarbamoyl)oxy]carbanilate melting at 142–3° after recrystallization from aqueous methanol.

*Analysis.*—Calculated for $C_{13}H_{18}N_2O_4$: C, 58.63; H, 6.81; N, 10.52. Found: C, 58.60; H, 6.97; N, 10.27.

In a pre-emergence test, an application of six pounds per acre killed 100% of mustard, lettuce, crabgrass, and pigweed, and 95% of flax.

On post-emergence testing of this compound, a dosage of six pounds per acre killed 100% of lettuce and carrots, 95% of mustard and crabgrass, and 80% of flax, with the surviving flax plants so severely injured that they were expected to die.

Example 8.—Methyl m-[(sec-butylcarbamoyl)oxy] carbanilate

Following the procedure described in Example 2, methyl m-hydroxycarbanilate was reacted with sec-butyl isocyanate in the presence of 1,4-diazabicyclo[2.2.2]octane. The crude product was extracted with cold 5% sodium hydroxide solution, and the remaining solid was recrystallized from benzene to yield methyl m-[(sec-butylcarbamoyl)oxy]carbanilate melting at 144.5–5.5°.

*Analysis.*—Calculated for $C_{13}H_{18}N_2O_4$: C, 58.63; H, 6.81; N, 10.52. Found: C, 58.79; H, 6.91; N, 10.29.

A pre-emergence application of six pounds per acre of this compound resulted in 100% kill of mustard, crabgrass, and pigweed, 95% kill of flax, and 90% kill of lettuce, with the surviving flax and lettuce plants severely injured and expected to die.

A dosage of six pounds per acre, applied post-emergently, killed 100% of mustard, lettuce, flax, and carrots, and 75% of crabgrass.

Example 9.—Methyl m-[(allylcarbamoyl)oxy] carbanilate

Allyl isocyanate (16.4 g.) was added dropwise to a solution of 30.0 g. of methyl m-hydroxycarbanilate and 2.1 g. of 1,4-diazabicyclo[2.2.2]octane in 300 ml. of ethyl acetate. The reaction mixture was heated at 60° for three hours, cooled, and filtered to yield 35.7 g. of crude product. Recrystallization from ethyl acetate or from methanol gave methyl m-[(allylcarbamoyl)oxy]carbanilate melting at 147–8°.

*Analysis.*—Calculated for $C_{12}H_{14}N_2O_4$: C, 57.59; H, 5.64; N, 11.20. Found: C, 57.61; H, 5.74; N, 10.91.

In a pre-emergence test, 100% of mustard, lettuce, German hay millet, flax, crabgrass, and carrots were killed by a six pound per acre application of this compound.

A dosage of six pounds per acre, applied post-emergently, killed 100% of mustard, lettuce, German hay millet, crabgrass, and carrots, and 95% of flax.

Example 10.—Methyl N-methyl-m-[(methylcarbamoyl) oxy]carbanilate

The intermediate methyl m-hydroxy-N-methylcarbanilate was prepared as follows: Methyl chloroformate (14.2 g.) was added dropwise to a solution of 36.9 g. of m-(methylamino)phenol in 300 ml. of acetonitrile, maintaining the temperature at 25°. When the addition was complete, the mixture was heated to 55°, stirred at this temperature for 2.5 hours, and cooled to room temperature. The acetonitrile was removed under reduced pressure and the residual oil was dissolved by addition of 500 ml. of water and 500 ml. of ether. The aqueous layer was extracted with ether and the combined ether layers were washed with a 5% hydrochloric acid solution and with water. After drying the ether solution over magnesium sulfate, the ether was evaporated to yield 20 g. of light yellow oil. A small portion of this crude methyl m-hydroxy-N-methylcarbanilate was distilled to obtain an analytical sample boiling at 80° ($5 \times 10^{-5}$ mm.).

*Analysis.*—Calculated for $C_9H_{11}NO_3$: C, 59.66; H, 6.12; N, 7.73. Found: C, 59.76; H, 6.24; N, 7.92.

The crude methyl m-hydroxy-N-methylcarbanilate was reacted with methyl isocyanate as follows: Methyl isocyanate (5.0 g.) was added dropwise to a solution of 14.5 g. methyl m-hydroxy-N-methylcarbanilate and 20 drops of triethylamine in 150 ml. of benzene. The reaction mixture was stirred at room temperature for 1.5 hours and heated at 57° for three hours. The solvent was removed to yield 18.9 g. of crude methyl N-methyl-m-[(methylcarbamoyl)oxy]carbanilate, a yellow oil. A small portion of this oil was distilled to give an analytical sample boiling at 85° ($5 \times 10^{-5}$ mm.).

*Analysis.*—Calculated for $C_{11}H_{14}N_2O_4$: C, 55.45; H, 5.92; N, 11.76. Found: C, 55.35; H, 6.09; N, 11.81.

In a pre-emergence test, 100% of mustard, lettuce, flax, and crabgrass, 90% of German hay millet, and 40% of barnyard grass were killed by a six pound per acre dosage of this compound.

On post-emergence testing, a six pound per acre dosage killed 100% of lettuce and flax, and 25% of mustard (with the surviving plants severely injured and expected to die); there was slight to moderate damage to German hay millet, crabgrass, and barnyard grass.

Example 11.—Methyl m-[(dimethylcarbamoyl)oxy] carbanilate

The intermediate m-aminophenyl dimethylcarbamate was prepared as follows: m-Nitrophenol (100.0 g.) was added portionwise to a solution of 38.8 g. of sodium methoxide in 300 ml. of methanol, the solution was heated at 60–65° for 1.5 hour, then evaporated to dryness. This sodium salt of m-nitrophenol (111.0 g.) was dissolved in 700 ml. of dioxane, and 67.3 g. of dimethylcarbamoyl chloride was added dropwise over a one-half hour period. The reaction mixture was heated at 60–65° for two hours, stirred overnight at room temperature, then poured into 3300 ml. of water. After stirring for one hour the crude m-nitrophenyl dimethylcarbamate (107.0 g., M.P. 48–55°) was isolated by filtration, and dissolved in 600 ml. of ethyl acetate. Platinum oxide (0.4 g.) was added and the mixture was hydrogenated in a Parr hydrogenation apparatus until the theoretical amount of hydrogen had been absorbed. The catalyst was removed by filtration and the filtrate was concentrated to dryness. The residual yellow oil solidified on standing and was recrystallized from a benzene-petroleum ether mixture to yield 80.0 g. of m-aminophenyl dimethylcarbamate melting at 80–6°.

This intermediate was reacted with methyl chloroformate as follows: To a solution of 9.9 g. of methyl chloroformate in 50 ml. of benzene, a solution of 18.0 g. of m-aminophenyl dimethylcarbamate and 10.1 g. of triethylamine in 175 ml. of benzene was added dropwise, maintaining the temperature of the reaction at 25–30°. After the addition was complete, the mixture was stirred for one hour at 40° and for one hour at room temperature, then poured into 250 ml. of ether. The solid was collected by filtration, washed with water to remove the amine hydrochloride, yielding 11.9 g. of crude methyl m-[(dimethylcarbamoyl)oxy]carbanilate melting at 144–5°. An additional 3.5 g. of product was obtained by concentration of the filtrate. Recrystallization from a benzene-hexane mixture raised the melting point to 145.0–5.5°.

*Analysis.*—Calculated for $C_{11}H_{14}N_2O_4$: C, 55.45; H, 5.92; N, 11.76. Found: C, 55.57; H, 6.03; N, 11.79.

In a pre-emergence test, an application of six pounds per acre of this compound killed 100% of mustard, German hay millet, flax, and crabgrass, 90% of lettuce (with the surviving plants severely injured and expected to die), and 70% of barnyard grass.

A post-emergence application of six pounds per acre killed 100% or mustard, lettuce, German hay millet, flax, crabgrass, and barnyard grass.

Example 12.—Methyl m-[(diethylcarbamoyl)oxy] carbanilate

A suspension of 4.6 g. of sodium hydride in oil was added slowly to a solution of 16.7 g. of methyl m-hydroxycarbanilate in 50 ml. of N,N-dimethylformamide and 200 ml. of xylene, maintaining the temperature at 30–35°. The mixture was stirred for one hour, then 13.6 g. of diethylcarbamoyl chloride was added dropwise, maintaining the temperature at 30–35°. When the addition was complete, the reaction mixture was heated for one hour at 55–60°, cooled, and the precipitate of sodium chloride removed by filtration. The filtrate was concentrated to dryness, the residue was washed with pentane, and triturated with water to give a crude solid product. After filtration and recrystallization from aqueous methanol, a yield of 16.2 g. of methyl m-[(diethylcarbamoyl)oxy]-carbanilate was obtained. A small portion was distilled at 120° (0.015 mm.) to give an analytical sample melting at 94–5°.

Analysis.—Calculated for $C_{13}H_{18}N_2O_4$: C, 58.63; H, 6.81; N, 10.52. Found: C, 58.58; H, 6.74; N, 10.76.

In a pre-emergence test, 100% of mustard, German hay millet, flax, and crabgrass, and 95% of lettuce and barnyard grass were killed by a six pound per acre application.

A post-emergence application of six pounds per acre of this compound killed 100% of mustard, lettuce, German hay millet, flax, crabgrass, and barnyard grass.

Example 13.—Methyl m-[[(2-methylallyl)carbamoyl]oxy]carbanilate

The intermediate chloroformate ester of methyl m-hydroxycarbanilate was prepared as follows: Methyl m-hydroxycarbanilate (33.4 g.) was converted to the sodium salt with sodium hydride as described in Example 12. This sodium salt was added portionwise to a solution of 19.8 g. of phosgene in 300 ml. of ethyl acetate, maintaining the temperature at −5 to 0°. The mixture was stirred for one hour as it warmed to room temperature, then filtered to yield 44 g. of the chloroformate ester of methyl m-hydroxycarbanilate.

The intermediate was reacted with 2-methylallylamine as follows: 2-methylallylamine (28.4 g.) was added dropwise to a solution of 45.9 g. of the chloroformate ester of methyl m-hydroxycarbanilate in 300 ml. of ethyl acetate, maintaining the temperature at 25–30°. The mixture was stirred for one hour and allowed to stand overnight. The precipitate of amine hydrochloride was removed by filtration and the filtrate was concentrated to dryness. The crude methyl m-[[(2-methylallyl)carbamoyl]oxy]carbanilate was recrystallized several times from a benzene-hexane mixture to obtain a sample melting at 127.5–8.5°.

Analysis.—Calculated for $C_{13}H_{16}N_2O_4$: C, 59.08; H, 6.10; N, 10.60. Found: C, 59.29; H, 6.27; N, 10.78.

In a pre-emergence test, 100% of mustard, German hay millet, flax, and crabgrass, 95% of barnyard grass, and 90% of lettuce were killed by a six pound per acre dosage. A post-emergence application of six pounds per acre of this compound killed 100% of mustard, lettuce, German hay millet, flax, crabgrass, and barnyard grass.

Example 14.—Sec-butyl m[(dimethylcarbamoyl)oxy] carbanilate

The intermediate m-aminophenyl dimethylcarbamate (Ex. 11) was reacted with sec-butyl chloroformate as follows: A solution of 18.0 g. of m-aminophenyl dimethylcarbamate and 10.1 g. of triethylamine in 200 ml. of benzene was added to a solution of 14.3 g. of sec-butyl chloroformate in 50 ml. of benzene, maintaining the temperature at 25–30°. The mixture was stirred for one hour at 45–50°, and allowed to stand over the weekend. The amine hydrochloride was removed by filtration and the filtrate was concentrated to dryness. The residual oil was dissolved in ether and the ether layer was washed with a cold 5% solution of hydrochloric acid and with water. After drying the solution over magnesium sulfate, the ether was removed to give a red oil which crystallized on standing. After recrystallization from a benzene-hexane mixture, a yield of 13.5 g. of sec-butyl m-[(dimethylcarbamoyl)oxy]carbanilate, melting at 92.5–4.0°, was obtained.

Analysis.—Calculated for $C_{14}H_{20}N_2O_4$: C, 59.98; H, 7.19; N, 9.99. Found: C, 59.94; H, 7.06; N, 10.13.

A dosage of six pounds per acre of this compound, applied pre-emergently, caused 100% kill of mustard and flax, 95% kill of crabgrass, 90% kill of lettuce and German hay millet, and moderate damage to barnyard grass.

On post-emergence testing, 100% of mustard, lettuce, and flax, and 90% of German hay millet were killed by a six pound per acre application. Crabgrass and barnyard grass were moderately injured.

Example 15.—S-methyl m-[(methylcarbamoyl)oxy] thiocarbanilate

The intermediate S-methyl m-hydroxythiocarbanilate was prepared as follows: A solution of 43.6 g. of m-aminophenol in 300 ml. of acetonitrile was warmed to 35°, and 22.0 g. of S-methyl chlorothioformate was added dropwise. The temperature of the mixture rose to 55°. The mixture was stirred for two hours at 70°, cooled to room temperature, and the precipitate (m-aminophenol hydrochloride) was removed by filtration. Concentration of the filtrate gave 36.1 g. of crude S-methyl m-hydroxythiocarbanilate melting at 135–9°. Two recrystallizations from aqueous methanol raised the melting point to 139–40°.

Analysis.—Calculated for $C_8H_9NO_2S$: C, 52.44; H, 4.95; N, 7.65. Found: C, 52.31; H, 5.07; N, 7.52.

This product was reacted with methyl isocyanate as follows: Methyl isocyanate (4.85 g.) was added dropwise to a stirred suspension of 15.5 g. of S-methyl m-hydroxythiocarbanilate and 25 drops of triethylamine in 150 ml. of benzene. When the addition was complete, the mixture was heated to 70° for two hours, then cooled. The crude product was isolated by filtration and recrystallized from aqueous methanol to yield 13.4 g. of white crystals melting at 153–8°. A second recrystallization of the S-methyl m-[(methylcarbamoyl)oxy]thiocarbanilate produced a sample melting at 153.5–4.5°.

Analysis.—Calculated for $C_{10}H_{12}N_2O_3S$: C, 49.98; H, 5.03; N, 11.66. Found: C, 49.71; H, 4.77; N, 11.79.

A pre-emergence application of six pounds per acre of this compound killed 100% of mustard, German hay millet, flax, crabgrass, and barnyard grass, and 80% of lettuce, with the surviving plants so severely injured they were almost certain to die.

In a post-emergence test, 100% of mustard, lettuce, German hay millet, flax, crabgrass, and barnyard grass were killed by a six pound per acre dosage.

Example 16.—Isopropyl m-[(methylcarbamoyl) oxy]carbanilate

Following the procedure described in Example 1, isopropyl m-hydroxycarbanilate, prepared from isopropyl chloroformate and m-aminophenol, was reacted with methyl isocyanate to yield isopropyl m-[(methylcarbamoyl)oxy]carbanilate melting at 158.0–9.5°, after recrystallization from aqueous ethanol.

Analysis.—Calculated for $C_{12}H_{16}N_2O_4$: C, 57.13; H, 6.39; N, 11.11. Found: C, 56.95; H, 6.22; N, 11.15.

The compound showed herbicidal activity at a dosage of 6 pounds per acre.

Example 17.—Methyl m-[(cyclohexylcarbamoyl) oxy]carbanilate

Cyclohexyl isocyanate (11.8 g.) was added dropwise to a solution of 15.0 g. of methyl m-hydroxycarbanilate and 1.1 g. of 1,4-diazabicyclo[2.2.2]octane in 150 ml. of benzene. The mixture was refluxed for one hour, cooled, and filtered. The white solid was recrystallized several times from aqueous methanol to yield 14.0 g. of methyl m - [(cyclohexylcarbamoyl)oxy]carbanilate melting at 166–7°.

*Analysis.*—Calculated for $C_{15}H_{20}N_2O_4$: C, 61.63; H, 6.90; N, 9.58. Found: C, 61.83; H, 7.13; N, 9.83.

The compound showed herbicidal activity at a dosage of 6 pounds per acre.

Example 18.—Methyl m-[(phenylcarbamoyl)oxy] carbanilate

Following the procedure described in Example 2, methyl m-hydroxycarbanilate was reacted with phenyl isocyanate, in the presence of 1,4-diazabicyclo[2.2.2]octane, to yield methyl m-[(phenylcarbamoyl)oxy]carbanilate. The crude product was dissolved in ethyl acetate, washed with a cold 5% solution of sodium hydroxide, and concentrated to dryness. The white solid melted at 154–5° after recrystallization from benzene.

*Analysis.*—Calculated for $C_{15}H_{14}N_2O_4$: C, 62.93; H, 4.93; N, 9.79. Found: C, 62.72; H, 4.97; N, 9.63.

The compound showed herbicidal activity at a dosage of 6 pounds per acre.

Example 19.—Allyl m-[(methylcarbamoyl)oxy] carbanilate

The intermediate allyl m-hydroxycarbanilate was prepared from m-aminophenol and allyl chloroformate following the procedure described in Example 1 for the preparation of methyl m-hydroxycarbanilate. The crude product was dissolved in ether and extracted with dilute hydrochloric acid and with water. The ether solution was concentrated to dryness and the residual solid was recrystallized from a benzene-petroleum ether mixture to yield allyl m-hydroxycarbanilate melting at 52–4°.

*Analysis.*—Calculated for $C_{10}H_{11}NO_3$: C, 62.16; H, 5.74; N, 7.25. Found: C, 62.02; H, 5.74; N, 7.18.

This intermediate was reacted with methyl isocyanate, following the procedure described in Example 2, to yield allyl m-[(methylcarbamoyl)oxy]carbanilate melting at 124.5–5.5° after recrystallization from aqueous methanol.

*Analysis.*—Calculated for $C_{12}H_{14}N_2O_4$: C, 57.59; H, 5.64; N, 11.20. Found: C, 57.79; H, 5.76; N, 10.98.

The compound showed herbicidal activity at a dosage of 6 pounds per acre.

Example 20.—Allyl m-[(tert-butylcarbamoyl)oxy] carbanilate

Following the procedure described in Example 2, allyl m-hydroxycarbanilate was reacted with tert-butyl isocyanate, in the presence of 1,4-diazabicyclo[2.2.2]octane, to yield allyl m-[(tert-butylcarbamoyl)oxy]carbanilate melting at 155–6° after recrystallization from aqueous methanol.

*Analysis.*—Calculated for $C_{15}H_{20}N_2O_4$: C, 61.63; H, 6.90; N, 9.58. Found: C, 61.91; H, 6.98; N, 9.58.

The compound showed herbicidal activity at a dosage of 6 pounds per acre.

Example 21.—Ethyl m-[(methylcarbamoyl)oxy] carbanilate

The intermediate ethyl m-hydroxycarbanilate (M.P. 97–80°) was prepared from m-aminophenol and ethyl chloroformate following the procedure described in Example 1 for the preparation of methyl m-hydroxycarbanilate.

*Analysis.*—Calculated for $C_9H_{11}NO_3$: C, 59.66; H, 6.12; N, 7.73. Found: C, 59.67; H, 6.28; N, 7.61.

This intermediate was reacted with methyl isocyanate, following the procedure described in Example 17, to yield ethyl m-[(methylcarbamoyl)oxy]carbanilate melting at 136–7° after recrystallization from toluene.

*Analysis.*—Calculated for $C_{11}H_{14}N_2O_4$: C, 55.45; H, 5.92; N, 11.76. Found: C, 55.60; H, 5.62; N, 11.58.

The compound showed herbicidal activity at a dosage of 6 pounds per acre.

Example 22.—Propyl m-[(methylcarbamoyl)oxy] carbanilate

The intermediate propyl m-hydroxycarbanilate (M.P. 72.0–3.5°) was prepared from m-aminophenol and propyl chloroformate following the procedure described in Example 1 for the preparation of methyl m-hydroxycarbanilate.

*Analysis.*—Calculated for $C_{10}H_{13}NO_3$: C, 61.52; H, 6.71; N, 7.18. Found: C, 61.73; H, 6.66; N, 7.21.

This intermediate was reacted with methyl isocyanate, following the procedure described in Example 17, to yield propyl m-[(methylcarbamoyl)oxy]carbanilate melting at 128.5–30.0° after recrystallization from toluene.

*Analysis.*—Calculated for $C_{12}H_{16}N_2O_4$: C, 57.13; H, 6.39; N, 11.11. Found: C, 57.34; H, 6.49; N, 10.92.

The compound showed herbicidal activity at a dosage of 6 pounds per acre.

Example 23.—Butyl m-[(methylcarbamoyl)oxy]carbanilate

The intermediate butyl m-hydroxycarbanilate (M.P. 87–8°) was prepared from m-aminophenol and butyl chloroformate following the procedure described in Example 1 for the preparation of methyl m-hydroxycarbanilate.

*Analysis.*—Calculated for $C_{11}H_{15}NO_3$: C, 63.14; H, 7.23; N, 6.69. Found: C, 62.89; H, 7.39; N, 6.78.

This intermediate was reacted with methyl isocyanate, following the procedure described in Example 17, to yield butyl m-[(methylcarbamoyl)oxy]carbanilate melting at 113.5–4.5° after recrystallization from benzene.

*Analysis.*—Calculated for $C_{13}H_{18}N_2O_4$: C, 58.63, H, 6.81; N, 10.52. Found: C, 58.37; H, 6.61; N, 10.38.

The compound showed herbicidal activity at a dosage of 6 pounds per acre.

Example 24.—Isobutyl m-[(methylcarbamoyl)oxy]carbanilate

The intermediate isobutyl m-hydroxycarbanilate (M.P. 106.5–8.0°) was prepared from m-aminophenol and isobutyl chloroformate following the procedure described in Example 1 for the preparation of methyl m-hydroxycarbanilate.

*Analysis.*—Calculated for $C_{11}H_{15}NO_3$: C, 63.14; H, 7.23; N, 6.69. Found: C, 63.40; H, 7.24; N, 6.74.

This intermediate was reacted with methyl isocyanate, following the procedure described in Example 17, to yield isobutyl m-[(methylcarbamoyl)oxy]carbanilate melting at 133–4° after recrystallization from benzene.

*Analysis.*—Calculated for $C_{13}H_{18}N_2O_4$: C, 58.63; H, 6.81; N, 10.52. Found: C, 58.82; H, 6.58; N, 10.34.

The compound showed herbicidal activity at a dosage of 6 pounds per acre.

Example 25.—Sec-butyl m-[(methylcarbamoyl)oxy]carbanilate

The intermediate sec-butyl m-hydroxycarbanilate (M.P. 117.5–8.5°) was prepared from m-aminophenol and sec-butyl chloroformate following the procedure described in Example 1 for the preparation of methyl m-hydroxycarbanilate.

*Analysis.*—Calculated for $C_{11}H_{15}NO_3$: C, 63.14; H, 7.23; N, 6.69. Found: C, 63.38; H, 7.19; N, 6.50.

This intermediate was reacted with methyl isocyanate, following the procedure described in Example 17, to yield sec-butyl m-[(methylcarbamoyl)oxy]carbanilate melting at 126.5–7.5° after recrystallization from benzene.

*Analysis.*—Calculated for $C_{13}H_{18}N_2O_4$: C, 58.63; H, 6.81; N, 10.52. Found: C, 58.88; H, 6.99; N, 10.50.

15

The compound showed herbicidal activity at a dosage of 6 pounds per acre.

Example 26.—Tert-butyl m-[(methylcarbamoyl)oxy] carbanilate

The intermediate tert-butyl m-hydroxycarbanilate was prepared as follows: A solution of m-aminophenol in 450 ml. of acetonitrile was added dropwise to a stirred solution of 54.6 g. of tert-butyl chloroformate in 200 ml. of acetonitrile, maintaining the temperature of the reaction mixture below 0°. When the addition was complete, the mixture was allowed to warm to room temperature, stirred for three hours, and allowed to stand for 48 hours. The mixture was filtered to remove the m-aminophenol hydrochloride, and the filtrate was concentrated to dryness. The residue was extracted with ether, the insoluble m-aminophenol was removed, and the ether solution was extracted with cold 5% hydrochloric acid solution and with water. The ether layer was dried over magnesium sulfate, evaporated to dryness and the residual solid recrystallized from aqueous methanol to yield 13.5 g. of tert-butyl m-hydroxycarbanilate melting at 135.0–5.5°.

*Analysis.*—Calculated for $C_{11}H_{15}NO_3$: C, 63.14; H, 7.23; N, 6.69. Found: C, 62.99; H, 7.48; N, 6.90.

This intermediate was reacted with methyl isocyanate, following the procedure described in Example 17, to yield tert-butyl m-[(methylcarbamoyl)oxy]carbanilate, melting at 157–8°.

*Analysis.*—Calculated for $C_{13}H_{18}N_2O_4$: C, 58.63; H, 6.81; N, 10.52. Found: C, 58.65; H, 6.70; N, 10.76.

The compound showed herbicidal activity at a dosage of 6 pounds per acre.

Example 27.—Sec-butyl m-[(tert-butylcarbamoyl)oxy] carbanilate

Following the procedure described in Example 2, sec-butyl m-hydroxycarbanilate was reacted with tert-butyl isocyanate to yield sec-butyl m-[(tert-butylcarbamoyl)-oxy]carbanilate melting at 140.0–40.5° after recrystallization from a benzene-hexane mixture.

*Analysis.*—Calculated for $C_{16}H_{24}N_2O_4$: C, 62.31; H, 7.85; N, 9.09. Found: C, 62.52; H, 7.96; N, 9.20.

The compound showed herbicidal activity at a dosage of 6 pounds per acre.

Example 28.—Methyl m-[(hexylcarbamoyl)oxy]carbanilate

Hexyl isocyanate (13.4 g.) was added dropwise to a stirred solution of 16.7 g. of methyl m-hydroxycarbanilate and 25 drops of triethylamine in 200 ml. of benzene, and the reaction mixture was stirred for nine hours at room temperature. The crude methyl m-[(hexylcarbamoyl)-oxy]carbanilate was isolated by filtration and recrystallized from aqueous methanol to yield 24.2 g. of pure product melting at 115.5–6.5°.

*Analysis.*—Calculated for $C_{15}H_{22}N_2O_4$: C, 61.20; H, 7.53; N, 9.52. Found: C, 61.19; H, 7.40; N, 9.27.

The compound showed herbicidal activity at a dosage of 6 pounds per acre.

Example 29.—Methyl m-[[(1,1,3,3-tetramethylbutyl) carbamoyl]oxy]carbanilate

The reactants, 12.5 g. of methyl m-hydroxycarbanilate, 1.0 g. of 1,4-diazabicyclo[2.2.2]octane, and 12.3 g. of 1,1,3,3-tetramethylbutyl isocyanate, were mixed by hand, and the mixture was heated in a stoppered flask at 60° for eight hours. Hexane (100 ml.) was added, the mixture was filtered, and the crude solid product was dissolved in 500 ml. of ethyl acetate and 100 ml. of ether. The solution was washed with a cold 5% solution of sodium hydroxide and with water, dried over magnesium sulfate, and concentrated to dryness. The residue was recrystallized from aqueous methanol to yield 10.0 g. of methyl m - [[(1,1,3,3-tetramethylbutyl)carbamoyl]oxy] carbanilate, melting at 150–1°. A second recrystallization from aqueous methanol raised the melting point to 152.0–2.5°.

*Analysis.*—Calculated for $C_{17}H_{26}N_2O_4$: C, 63.33; H, 8.13; N, 8.69. Found: C, 63.57; H, 7.89; N, 8.73.

The compound showed herbicidal activity at a dosage of 6 pounds per acre.

Example 30.—Allyl m-[(allylcarbamoyl)oxy] carbanilate

Following the procedure described in Example 28, allyl m-hydroxycarbanilate was reacted with allyl isocyanate to yield allyl m-[(allylcarbamoyl)oxy]carbanilate melting at 105.5–6.0° after recrystallization from aqueous methanol.

*Analysis.*—Calculated for $C_{14}H_{16}N_2O_4$: C, 60.86; H, 5.83; N, 10.14. Found: C, 60.59; H, 6.03; N, 9.95.

The compound showed herbicidal activity at a dosage of 6 pounds per acre.

Example 31.—Sec-butyl-m-[(isopropylcarbamoyl)oxy] carbanilate

Following the procedure described in Example 17, sec-butyl m-hydroxycarbanilate was reacted with isopropyl isocyanate, in the presence of triethylamine, to yield sec-butyl m-[(isopropylcarbamoyl)oxy]carbanilate melting at 151.5–2.0° after recrystallization from aqueous methanol.

*Analysis.*—Calculated for $C_{15}H_{22}N_2O_4$: C, 61.20; H, 7.53; N, 9.52. Found: C, 61.20; H, 7.73; N, 9.68.

The compound showed herbicidal activity at a dosage of 6 pounds per acre.

Example 32.—Pentyl m-[(methylcarbamoyl)oxy] carbanilate

The intermediate pentyl m-hydroxycarbanilate was prepared as follows: Pentyl chloroformate (30.1 g.) was added dropwise to a solution of 43.6 g. of m-aminophenol in 300 ml. of acetonitrile. The reaction was exothermic and the temperature had risen to 42° by the time the addition was complete. The reaction mixture was heated to 76°, maintained at that temperature for one hour, then allowed to cool to room temperature. The mixture was poured into ice water and the water extracted with ether. The ether solution was washed with 10% hydrochloric acid solution and with water, dried over magnesium sulfate and concentrated to dryness. The residual solid was recrystallized from a benzene-hexane mixture to yield 28.7 g. of pentyl m-hydroxycarbanilate melting at 80.0–81.5°. Further recrystallization from benzene raised the melting point to 82.5–3.0°.

*Analysis.*—Calculated for $C_{12}H_{17}NO_3$: C, 64.55; H, 7.68; N, 6.27. Found: C, 64.66; H, 7.38; N, 6.50.

This intermediate was reacted with methyl isocyanate as follows: Methyl isocyanate (4.9 g.) was added dropwise to a stirred mixture of 16.7 g. of pentyl m-hydroxycarbanilate and 25 drops of triethylamine in 200 ml. of benzene. When the addition was complete, the solution was heated to 65° and maintained at this temperature for two hours, then allowed to cool. The white solid was collected by filtration and recrystallized from aqueous methanol to yield 17.3 g. of pentyl m-[(methylcarbamoyl)oxy] carbanilate melting at 106.5–7.5°.

*Analysis.*—Calculated for $C_{14}H_{20}N_2O_4$: C, 59.98; H, 7.19; N, 9.99. Found: C, 60.19; H, 7.09; N, 10.19.

The compound showed herbicidal activity at a dosage of 6 pounds per acre.

Example 33.—1-methylbutyl m-[(methylcarbamoyl) oxy]carbanilate

The intermediate 1-methylbutyl m-hydroxycarbanilate (M.P. 86.5–7.0°) was prepared from m-aminophenol and 1-methylbutyl chloroformate following the procedure described in Example 32 for the preparation of pentyl m-hydroxycarbanilate.

*Analysis.*—Calculated for $C_{12}H_{17}NO_3$: C, 64.55; H, 7.68; N, 6.27. Found: C, 64.40; H, 7.73; N, 6.55.

This intermediate was reacted with methyl isocyanate, following the procedure described in Example 32, to yield 1 - methylbutyl m - [(methylcarbamoyl)oxy]carbanilate melting at 115.5–6.0° after recrystallization from benzene.

*Analysis.*—Calculated for $C_{14}H_{20}N_2O_4$: C, 59.98; H, 7.19; N, 9.99. Found: C, 60.25; H, 7.40; N, 9.98.

The compound showed herbicidal activity at a dosage of 6 pounds per acre.

Example 34.—1-ethylpropyl m-[(methylcarbamoyl)oxy]carbanilate

The intermediate 1-ethylpropyl m-hydroxycarbanilate (M.P. 108.5–9.5°) was prepared from m-aminophenol and 1-ethylpropyl chloroformate following the procedure described in Example 1 for the preparation of methyl m-hydroxycarbanilate.

*Analysis.*—Calculated for $C_{12}H_{17}NO_3$: C, 64.55; H, 7.68; N, 6.27. Found: C, 64.69; H, 7.52; N, 6.53.

This intermediate was reacted with methyl isocyanate, following the procedure described in Example 32, to yield 1 - ethylpropyl m - [(methylcarbamoyl)oxy]carbanilate melting at 129–30° after recrystallization from aqueous methanol.

*Analysis.*—Calculated for $C_{14}H_{20}N_2O_4$: C, 59.98; H, 7.19; N, 9.99. Found: C, 59.85; H, 7.26; N, 9.88.

The compound showed herbicidal activity at a dosage of 6 pounds per acre.

Example 35.—1,2-dimethylpropyl m-[(methylcarbamoyl)oxy]carbanilate

The intermediate 1,2 - dimethylpropyl m - hydroxycarbanilate (M.P. 137–8°) was prepared from m-aminophenol and 1,2-dimethylpropyl chloroformate following the procedure described in Example 1 for the preparation of methyl m-hydroxycarbanilate.

*Analysis.*—Calculated for $C_{12}H_{17}NO_3$: C, 64.55; H, 7.68; N, 6.27. Found: C, 64.36; H, 7.50; N, 6.46.

This intermediate was reacted with methyl isocyanate, following the procedure described in Example 32, to yield 1,2 - dimethylpropyl m - [(methylcarbamoyl)oxy]carbanilate melting at 143–4° after recrystallization from aqueous methanol.

*Analysis.*—Calculated for $C_{14}H_{20}N_2O_4$: C, 59.98; H, 7.19; N, 9.99. Found: C, 60.00; H, 7.14; N, 9.85.

The compound showed herbicidal activity at a dosage of 6 pounds per acre.

Example 36.—2-methylallyl m-[(methylcarbamoyl)oxy]carbanilate

The intermediate 2-methylallyl m-hydroxycarbanilate was prepared as follows: 2-methylallyl chloroformate (26.8 g.) was added dropwise to a solution of 43.6 g. of m-aminophenol in 300 ml. of acetonitrile. The temperature rose to 62° during the addition and a solid settled out of the solution. The slurry was heated at 70° for two hours, cooled to room temperature, and filtered. The filtrate was concentrated to dryness, the residual oil was dissolved in benzene, and the benzene solution was washed with 10% hydrochloric acid solution and with water. After drying the solution over magnesium sulfate, the benzene was removed under reduced pressure, to yield a brown oil which crystallized on standing. Recrystallization from a benzene-petroleum ether mixture produced 17.3 g. of 2-methylallyl m-hydroxycarbanilate melting at 66–7°. A second recrystallization from the same solvent raised the melting point to 68–9°.

*Analysis.*—Calculated for $C_{11}H_{13}NO_3$: C, 63.75; H, 6.32; N, 6.76. Found: C, 64.04; H, 6.49; N, 7.03.

This intermediate was reacted with methyl isocyanate, following the procedure described in Example 32, to yield 2-methylallyl m-[(methylcarbamoyl)oxy]carbanilate melting at 126–7° after recrystallization from aqueous methanol.

*Analysis.*—Calculated for $C_{13}H_{16}N_2O_4$: C, 59.08; H, 6.10; N, 10.60. Found: C, 58.83; H, 6.34; N, 10.83.

The compound showed herbicidal activity at a dosage of 6 pounds per acre.

Example 37.—2-propynyl m-[(methylcarbamoyl)oxy]carbanilate

The intermediate 2-propynyl m-hydroxycarbanilate (M.P. 83.0–4.5°) was prepared from m-aminophenol and 2-propynyl chloroformate following the procedure described in Example 36 for the preparation of 2-methylallyl m-hydroxycarbanilate.

*Analysis.*—Calculated for $C_{10}H_9NO_3$: C, 62.82; H, 4.75; N, 7.33. Found: C, 63.06; H, 4.76; N, 7.41.

This intermediate was reacted with methyl isocyanate, following the procedure described in Example 32, to yield 2-propynyl m-[(methylcarbamoyl)oxy]carbanilate melting at 128–9° after recrystallization from aqueous methanol.

*Analysis.*—Calculated for $C_{12}H_{12}N_2O_4$: C, 58.06; H, 4.87; N, 11.29. Found: C, 57.78; H, 5.06; N, 11.49.

The compound showed herbicidal activity at a dosage of 6 pounds per acre.

Example 38.—Methyl m-[(dimethylcarbamoyl)oxy]-N-methylcarbanilate

A suspension of 4.0 g. of sodium hydride in oil was added portionwise to a solution of 15.5 g. of methyl m-hydroxy-N-methylcarbanilate in 40 ml. of N,N-dimethylformamide and 160 ml. of xylene. The mixture was stirred at 55–60° for one hour, cooled to 22°, and 9.3 g. of dimethylcarbamoyl chloride was added dropwise over a 15 minute period. The reaction mixture was stirred at room temperature overnight, then filtered to remove the precipitate of sodium chloride. The filtrate was evaporated to dryness, the residual oil dissolved in ether, and the ether solution washed with a cold 5% solution of sodium hydroxide and with water. After drying over magnesium sulfate, the ether was removed and the residual semi-solid was thoroughly washed with pentane to remove the oil. The crude product was recrystallized from a benzene-hexane mixture to yield methyl m-[(dimethylcarbamoyl)oxy]-N-methylcarbanilate melting at 71–3°. A small portion was sublimed at 80° (0.01 mm.) to give an analytical sample melting at 78–9°.

*Analysis.*—Calculated for $C_{12}H_{16}N_2O_4$: C, 57.13; H, 6.39; N, 11.11. Found: C, 57.22; H, 6.63; N, 11.28.

The compound showed herbicidal activity at a dosage of 6 pounds per acre.

Example 39.—Methyl m-[(diisopropylcarbamoyl)oxy]carbanilate

Following the procedure described in Example 38, methyl m-hydroxycarbanilate was converted to the sodium salt with sodium hydride, and this sodium salt was reacted with diisopropylcarbamoyl chloride to yield methyl m-[(diisopropylcarbamoyl)oxy]-carbanilate melting at 113–4° after recrystallization from a benzenehexane mixture.

*Analysis.*—Calculated for $C_{15}H_{22}N_2O_4$: C, 61.20; H, 7.53; N, 9.52. Found: C, 61.27; H, 7.69; N, 9.57.

The compound showed herbicidal activity at a dosage of 6 pounds per acre.

Example 40.—Methyl m-[(butylmethylcarbamoyl)oxy]carbanilate

Following the procedure described in Example 38, methyl m-hydroxycarbanilate was converted to the sodium salt with sodium hydride, and this sodium salt was reacted with butylmethylcarbamoyl chloride to yield methyl m-[(butylmethylcarbamoyl)oxy]carbanilate melting at 86–8°. A small portion was distilled at 130° (0.025 mm.) to give an analytical sample.

*Analysis.*—Calculated for $C_{14}H_{20}N_2O_4$: C, 59.98; H, 7.19; N, 9.99. Found: C, 60.03; H, 7.12; N, 9.78.

Example 41.—Sec-butyl m-[(diethylcarbamoyl)oxy]-carbanilate

Following the procedure described in Example 38, sec-butyl m-hydroxycarbanilate was converted to the sodium salt with sodium hydride, and this sodium salt was reacted with diethylcarbamoyl chloride to yield sec-butyl m[(diethylcarbamoyl)oxy]carbanilate melting at 58–60°. A small portion was distilled at 135° (0.025 mm.) to give an analytical sample.

*Analysis.*—Calculated for $C_{16}H_{24}N_2O_4$: C, 62.31; H, 7.85; N, 9.09. Found: C, 62.32; H, 7.74; N, 9.24.

The compound showed herbicidal activity at a dosage of 6 pounds per acre.

Example 42.—S-ethyl m-[(methylcarbamoyl)oxy]-thiocarbanilate

The intermediate S-ethyl m-hydroxythiocarbanilate (MP. 79–80°) was prepared from m-aminophenol and S-ethyl chlorothioformate following the procedure described in Example 15 for the preparation of S-methyl m-hydroxythiocarbanilate.

*Analysis.*—Calculated for $C_9H_{11}NO_2S$: C, 54.79; H, 5.62; N, 7.10. Found: C, 54.85; H, 5.39; N, 7.36.

This intermediate was reacted with methyl isocyanate, following the procedure described in Example 15, to yield S-ethyl m-[(methylcarbamoyl)oxy]thiocarbanilate melting at 154–5° after recrystallization from aqueous methanol.

*Analysis.*—Calculated for $C_{11}H_{14}N_2O_3S$: C, 51.94; H, 5.50; N, 11.01. Found: C, 51.82; H, 5.37; N, 11.18.

The compound showed herbicidal activity at a dosage of 6 pounds per acre.

Example 43.—Methyl m-[[(m-chlorophenyl)carbamoyl] oxy]carbanilate

Following the procedure described in Example 17, methyl m-hydroxycarbanilate was reacted with m-chlorophenyl isocyanate to yield methyl m-[[(m-chlorophenyl)carbamoyl]oxy]carbanilate melting at 159–61° after recrystallization from methanol.

*Analysis.*—Calculated for $C_{15}H_{13}ClN_2O_4$: C, 56.17; H, 4.09; N, 8.73. Found: C, 55.90; H, 3.88; N, 8.52.

The compound showed herbicidal activity at a dosage of 6 pounds per acre.

Example 44.—Cyclohexyl m-[(methylcarbamoyl)oxy] carbanilate

The intermediate cyclohexyl m-hydroxycarbanilate was prepared as follows: Cyclohexyl chloroformate (60.2 g.) was added dropwise to a solution of 87.3 g. of m-aminophenol in 700 ml. of acetonitrile, maintaining the temperature below 32°. When the addition was complete, the mixture was refluxed for two hours, cooled, and filtered. The solid was washed with water to remove the amine hydrochloride, leaving 61.4 g. of crude product. An additional 17.1 g. of product were obtained by evaporation of the filtrate. The combined samples were recrystallized from aqueous methanol, and from an ethyl acetate-toluene mixture, to yield 52.6 g. of cyclohexyl m-hydroxycarbanilate melting at 179–80°.

*Analysis.*—Calculated for $C_{13}H_{17}NO_3$: C, 66.36; H, 7.28; N, 5.95. Found: C, 66.43; H, 7.32; N, 6.16.

This intermediate was reacted with methyl isocyanate as follows: Methyl isocyanate (9.0 g.) was added dropwise to a solution of 35.3 g. of cyclohexyl m-hydroxycarbanilate and six drops of triethylamine in 300 ml. of ethyl acetate. The mixture was refluxed for one hour, then concentrated to dryness. A yield of 20.9 g. of cyclohexyl m-[(methylcarbamoyl)oxy]carbanilate was obtained by recrystallization of the crude product from aqueous methanol and from ethyl acetate.

*Analysis.*—Calculated for $C_{15}H_{20}N_2O_4$: C, 61.63; H, 6.90; N, 9.58. Found: C, 61.74; H, 7.17; N, 9.46.

The compound showed herbicidal activity at a dosage of 6 pounds per acre.

Example 45.—Phenyl m-[(methylcarbamoyl)oxy] carbanilate

The intermediate phenyl m-hydroxycarbanilate (M.P. 180.0–81.5°) was prepared from m-aminophenol and phenyl chloroformate following the procedure described in Example 44 for the preparation of cyclohexyl m-hydroxy carbanilate.

*Analysis.*—Calculated for $C_{13}H_{11}NO_3$: C, 68.11; H, 4.84; N, 6.11. Found: C, 68.04; H, 5.00; N, 6.00.

This intermediate was reacted with methyl isocyanate, following the procedure described in Example 17, to yield phenyl m-[(methylcarbamoyl)oxy]carbanilate melting at 163.0–3.5° after recrystallization from aqueous methanol.

*Analysis.*—Calculated for $C_{15}H_{14}N_2O_4$: C, 62.93; H, 4.93; N, 9.79. Found: C, 63.07; H, 4.99; N, 9.52.

The compound showed herbicidal activity at a dosage of 6 pounds per acre.

Example 46.—2-methoxyethyl m-[(methylcarbamoyl) oxy]carbanilate

The intermediate 2-methoxyethyl m-hydroxycarbanilate (M.P. 70–3°) was prepared from m-aminophenol and 2-methoxyethyl chloroformate following the procedure described in Example 36 for the preparation of 2-methylallyl m-hydroxycarbanilate.

*Analysis.*—Calculated for $C_{10}H_{13}NO_4$: C, 56.86; H, 6.20; N, 6.63. Found: C, 57.14; H, 6.36; N, 6.39.

This intermediate was reacted with methyl isocyanate, following the procedure described in Example 32, to yield 2-methoxyethyl m-[(methylcarbamoyl)oxy]carbanilate melting at 84–5° after recrystallization from aqueous methanol.

*Analysis.*—Calculated for $C_{12}H_{16}N_2O_5$: C, 53.72; H, 6.01; N, 10.44. Found: C, 53.67; H, 5.82; N, 10.66.

The compound showed herbicidal activity at a dosage of 6 pounds per acre.

Example 47.—Benzyl m-[(methylcarbamoyl)oxy] carbanilate

The intermediate benzyl m-hydroxycarbanilate was prepared as follows: Benzyl chloroformate (34.1 g.) was added dropwise to a stirred solution of 43.6 g. of m-aminophenol in 300 ml. of acetonitrile. The temperature, which rose to 40° during the addition, was increased to 55–60° and maintained there for two hours. After cooling, the mixture was poured into 1200 ml. of ice-water, the suspension was stirred for one hour, and the crude product was collected by filtration and recrystallized from a benzene-hexane mixture. A yield of 37.1 g. of benzyl m-hydroxycarbanilate, melting at 126–7° was obtained. A second recrystallization from benzene raised the melting point to 127.5–8.0°.

*Analysis.*—Calculated for $C_{14}H_{13}NO_3$: C, 69.12; H, 5.39; N. 5.76. Found: C, 68.90; H, 5.09; N, 6.02.

This intermediate was reacted with methyl isocyanate, following the procedures described in Example 32, to yield benzyl m-[(methylcarbamoyl)oxy]carbanilate melting at 120.0–20.5° after recrystallization from aqueous methanol.

*Analysis.*—Calculated for $C_{16}H_{16}N_2O_4$: C, 63.99; H, 5.37; N, 9.33. Found: C, 64.20; H, 5.12; N, 9.20.

The compound showed herbicidal activity at a dosage of 6 pounds per acre.

Other examples of compounds falling within the generic formulas presented herein, which may be formulated into herbicidal compositions and applied as herein illustrated are:

methyl-m[(cyclopropylcarbamoyl)oxy]carbanilate
ethyl m-[(tert-butylcarbamoyl)oxy]carbanilate
cyclopropyl m-[(isopropylcarbamoyl)oxy]carbanilate propyl m-[(tert-butylcarbamoyl)oxy]carbanilate
butyl m-[(tert-butylcarbamoyl)oxy]carbanilate
methyl m-[(neopentylcarbamoyl)oxy]carbanilate
methyl m-[(tert-butylcarbamoyl)oxy]-N-methylcarbanilate
methyl m-[(piperidinocarbonyl)oxy]carbanilate
methyl m-[(tert-butylmethylcarbamoyl)oxy]carbanilate
ethyl m-[(ethylisopropylcarbamoyl)oxy]carbanilate
S-methyl m-[(tert-butylcarbamoyl)oxy]thiocarbanilate
methyl N-ethyl-m-[(methylcarbamoyl)oxy]carbanilate
S-methyl m-[(isopropylcarbamoyl)oxy]thiocarbanilate
ethyl m[[(2-methylallyl)carbamoyl]oxy]carbanilate It is clear that the classes of m-(carbamoyloxy)carbanilate esters described and illustrated herein are characterized by herbicidal activity, and that the degree of this activity varies among specific compounds within these classes and to some extent among the species of plant to which these compounds may be applied. Thus, selection of a specific herbicidal compound to control undesirable plant species without injury to a desired crop species may readily be made.

The active herbicidal compounds of this invention may be formulated and/or applied with insecticides, fungicides, nematocides, plant growth regulators, fertilizers, and other agricultural chemicals and may be used as effective soil sterilants as well as in herbicidal applications. In applying an active compound of this invention, whether formulated alone or with other agricultural chemicals, an effective amount and concentration of the m-[(N-substituted-carbamoyl)oxy]carbanilate ester is of course employed.

It is apparent that various modifications may be made in the formulation and application of the novel compounds of this invention, without departing from the inventive concept herein, as defined in the following claims.

We claim:
1. Novel chemical compounds of the formula

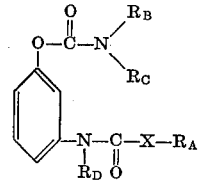

wherein $R_A$ is the radical of an aliphatic or cycloalkyl alcohol of the formula $R_AOH$ or a phenol of the formula $R_AOH$,

is the radical of a primary or secondary amine of the formula

where $R_B$ and $R_C$ are hydrocarbon or monochlorohydrocarbon or hydrocarbon containing an ether oxygen or $R_C$ is hydrogen,

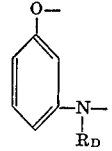

is the radical of an m-aminophenol of the formula

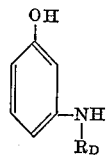

$R_D$ is hydrogen or a methyl group and X is oxygen or sulfur, none of said $R_A$, $R_B$, or $R_C$ having over eight carbon atoms.

2. Compounds as set forth in claim 1 in which $R_A$ is an aliphatic hydrocarbon radical.
3. Compounds as set forth in claim 1 in which $R_A$, $R_B$, $R_C$, and $R_D$ contain only carbon and hydrogen.
4. Compounds as set forth in claim 1 in which $R_B$ is a hydrocarbon radical and $R_C$ is hydrogen or a hydrocarbon radical and $R_D$ is hydrogen or methyl.
5. Compounds as set forth in claim 4 in which any hydrocarbon radicals of $R_B$ and $R_C$ are aliphatic and the sum of the lengths of the longest straight chain, or single carbon, of the $R_B$ substituent and the longest straight chain, or single carbon, of any $R_C$ substituent is at most four carbon atoms.
6. Compounds as set forth in claim 4 in which $R_A$ is an aliphatic hydrocarbon radical of one to four carbon atoms and X is oxygen.
7. Compounds as set forth in claim 4 in which $R_A$ is an aliphatic hydrocarbon radical of less than three carbon atoms and X is sulfur.
8. Compounds as set forth in claim 5 in which $R_A$ is alkyl of one to four carbons and X is oxygen.
9. Compounds as set forth in claim 5 in which $R_A$ is alkyl of less than three carbon atoms and X is sulfur.
10. Compounds as set forth in claim 6 in which $R_A$ is alkyl.
11. Compounds as set forth in claim 5 in which $R_A$ is methyl.
12. Compound as set forth in claim 1 on the formula methyl m-[(methylcarbamoyl)oxy]carbanilate.
13. Compound as set forth in claim 1 of the formula methyl m-[(isopropylcarbamoyl)oxy]carbanilate.
14. Compound as set forth in claim 1 of the formula methyl m[(tert-butylcarbamoyl)oxy]carbanilate.
15. Herbicidal compositions comprising as an essential active ingredient an effective herbicidal amount of a compound of the formula

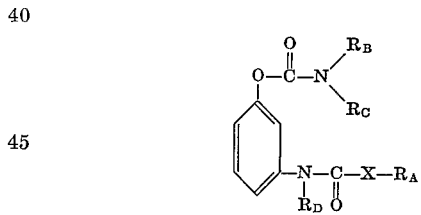

wherein $R_A$ is the radical of an aliphatic or cycloalkyl alcohol of the formula $R_AOH$ or a phenol of the formula $R_AOH$,

is the radical of a primary or secondary amine of the formula

where $R_B$ and $R_C$ are hydrocarbon or monochlorohydrocarbon or hydrocarbon containing an ether oxygen or $R_C$ is hydrogen,

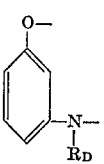

is the radical of an m-aminophenol of the formula

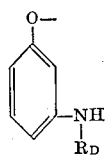

$R_D$ is hydrogen or a methyl group and X is oxygen or sulfur, none of said $R_A$, $R_B$, or $R_C$ having over eight carbon atoms.

16. Herbicidal compositions comprising as an essential active ingredient an effective herbicidal amount of a compound as set forth in claim 15 in which $R_A$, $R_B$, $R_C$ and $R_D$ contain only carbon and hydrogen.

17. Herbicidal compositions as in claim 16 in which $R_C$ and $R_D$ are hydrogen.

18. Method of controlling undesired plant growth which comprises applying to the locus wherein control is desired a herbicidal amount of a compound of the formula

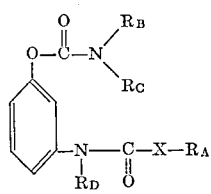

wherein $R_A$ is the radical of an aliphatic or cycloalkyl alcohol of the formula $R_A OH$ or a phenol of the formula $R_A OH$,

is the radical of a primary or secondary amine of the formula

where $R_B$ and $R_C$ are hydrocarbon or monochlorohydrocarbon or hydrocarbon containing an ether oxygen or $R_C$ is hydrogen,

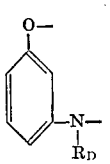

is the radical of an m-aminophenol of the formula

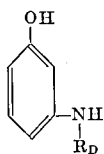

$R_D$ is hydrogen or a methyl group and X is oxygen or sulfur, none of said $R_A$, $R_B$, or $R_C$ having over eight carbon atoms.

19. Method as set forth in claim 18 in which $R_A$ is an aliphatic hydrocarbon radical.

20. Method as set forth in claim 18 in which $R_A$, $R_B$, $R_C$ and $R_D$ contain only carbon and hydrogen.

21. Method as set forth in claim 18 in which $R_A$ is an aliphatic hydrocarbon radical of less than three carbon atoms, $R_B$ is a hydrocarbon radical, $R_C$ is hydrogen or a hydrocarbon radical, $R_D$ is hydrogen or methyl, and X is sulfur.

22. Method as set forth in claim 21 in which any hydrocarbon radicals of $R_B$ and $R_C$ are aliphatic and $R_A$ is alkyl of one to four carbons; the sum of the lengths of the longest straight chain or single carbon of the $R_B$ substituent, and the longest straight chain or single carbon of any $R_C$ substituent, is at most four carbon atoms; and X is oxygen.

23. Method as set forth in claim 22 in which $R_A$ is methyl.

24. Method as set forth in claim 18 in which the compound is of the formula methyl m-((isopropylcarbamoyl)oxy)-carbanilate.

25. Method as set forth in claim 18 in which the compound is of the formula methyl m-((tert-butylcarbamoyl)oxy)-carbanilate.

References Cited

UNITED STATES PATENTS

| | | | |
|---|---|---|---|
| 2,362,308 | 11/1944 | Stevens et al. | 260—479 |
| 2,978,310 | 4/1961 | Daams et al. | 71—2.3 |
| 3,037,993 | 6/1962 | Shulgin | 71—2.6 XR |

OTHER REFERENCES

Weizman et al.: JOC 13, pp. 796–799, 1948.

Derwent: French Patent Abstracts, vol. 8, No. 1, Jan. 8, 1968. S. Afr., 67/4,310, "Algicides." General Organic, p. 6.

LEWIS GOTTS, *Primary Examiner.*

G. HOLLRAH, *Assistant Examiner.*